Patented Jan. 16, 1951

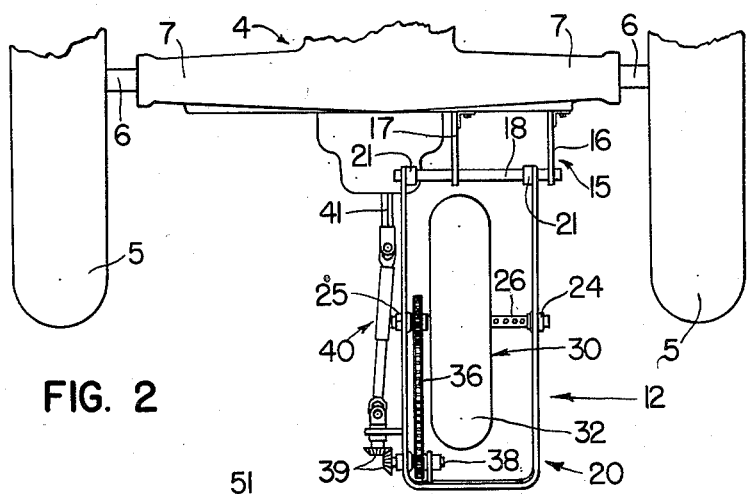
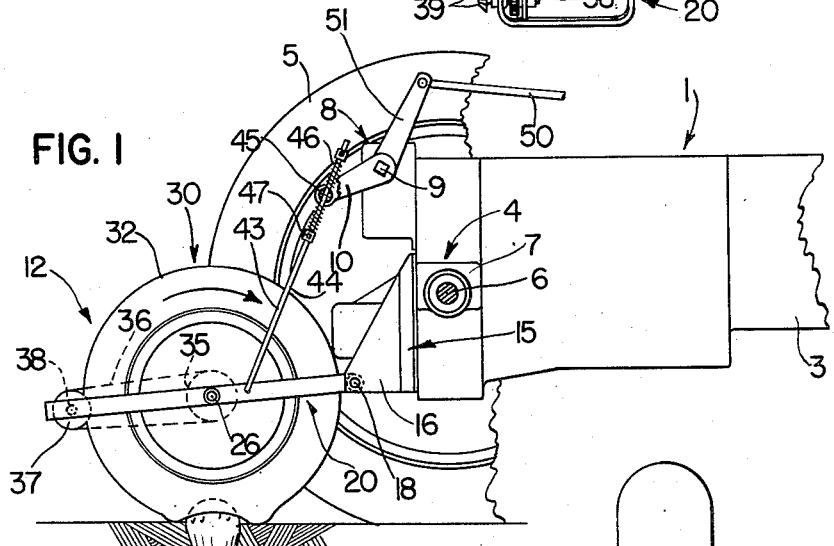
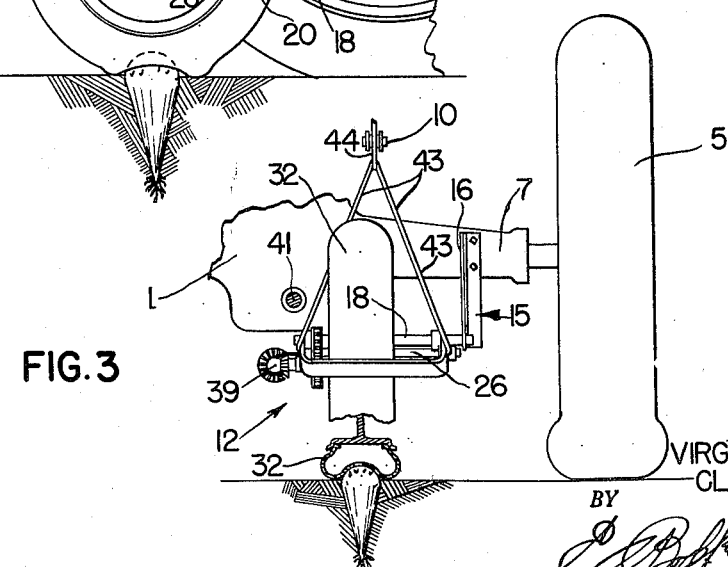

2,538,351

UNITED STATES PATENT OFFICE 2,538,351

BEET CROWN ABRADING MEANS

Virgil F. Bozeman and Claude W. Walz, Rock Island, Ill., assignors to Deere & Company, Moline, Ill., a corporation of Illinois Application May 5, 1947, Serial No. 746,066

1 Claim. (Cl. 56—229)

The present invention relates generally to agricultural implements and more particularly to machines for harvesting sugar beets and the like.

The object and general nature of the present invention is the provision of a new and improved sugar beet harvester which includes means for abrading or polishing the crowns of the beets while they are still in the ground in order to remove the tops, or at least a portion thereof, together with the leaf stubs, leaf scar and the like by scrubbing, polishing or abrading action, but without removing any appreciable quantity of the sugar bearing portions of the beet crowns. The beets are subsequently lifted from the ground by another machine.

More specifically, it is a feature of the present invention to provide a new and improved beet crown polishing unit in the form of a rotary abrading wheel having a plowlike peripheral section, preferably but not necessarily inflatable, and if inflatable such inflation is preferably to a low degree only whereby, in view of such low pressure, the abrading unit may be forced downwardly onto the beets to an extent to cause the peripheral portions of the abrading surface to abrade substantially entirely the beet crowns and so remove substantially all leaves, leaf scar, leaf stubs and the like by the rotation of the abrading wheel while the outfit travels down a beet row.

A further feature of this invention is the provision of a beet crown abrading unit in the form of a rotary inflatable or pneumatic tire-like member arranged to embrace at least the major portions of each beet crown and to be disposed in a vertical longitudinal plane coinciding with the vertical longitudinal plane of the beet row.

These and other objects and advantages of the present invention will be apparent to those skilled in the art after a consideration of the following detailed description, taken in conjunction with the accompanying drawings in which:

Figure 1 is a side view of a beet harvester in which the principles of the present invention have been incorporated.

Figure 2 is a plan view of the beet crown abrading or polishing unit.

Figure 3 is a rear view of the beet crown harvesting or abrading unit.

Referring now to the drawings, particularly Figure 1, the beet harvester of the present invention is shown as mounted on a tractor 1 of more or less conventional construction, embodying front steerable wheels (not shown), a narrow elongated supporting frame 3 and a rear axle structure 4 which includes rear wheels 5 mounted on axle shafts 6 journaled for rotation in lateral extensions 7 that form a part of the rear axle 4. The tractor 1 is preferably equipped with a power lift unit 8 having a power actuated rockshaft 9 and a power lift arm 10.

Sugar beets are usually harvested at the time when there are still considerable quantities of leaves and the like growing from the upper portions of the beet crowns and the beet crowns may also be covered, either wholly or partially, with leaf stubs, leaf scar and the like, all of which portions contain essentially no sugar. It is therefore desirable to remove the leaves, leaf scar, leaf stubs and the like from the beet crowns but it is likewise desirable not to remove any portions of the beet crowns which contain valuable sugar. According to the principles of the present invention, we have devised a new and useful beet crown abrading unit adapted to embrace the upper portions of the beet crowns and remove leaf scar, leaf stubs, and in some cases the entire quantity of leaves from the beet crowns but without cutting away any of the sugar bearing portions of the crowns. The present invention is adapted for use with other devices, such as, knives, sickles and the like, which may remove and/or shred the major portions of the leaves and move them away from the beet row, after which our new beet crown abrading unit is adapted to clean the top of the beet, removing all leaf scar and the like therefrom whereby, when the beets are subsequently harvested and delivered to the sugar mill, the tare is reduced and the value of the crop to the farmer proportionately increased. It is to be understood, of course, that our new and improved beet crown abrading unit may be under certain conditions used without having previously cut or shredded the major portions of the leaves from the beet crowns.

The beet crown abrading unit is indicated in its entirety by the reference numeral 12 and comprises a bracket 15 fixed to the rear side of the right hand rear axle extension 7 of the tractor 1 and includes laterally spaced sections 16 and 17 that extend rearwardly and are apertured to receive a transverse supporting shaft 18, which may be fixed, as by welding, to one of the bracket sections 16 and 17. A vertically swingable frame 20 is pivotally mounted on the shaft 18, being held in position thereon against lateral displacement by a pair of set screw collars 21, as best shown in Figure 2. The frame 20 preferably comprises a generally U-shaped member, the central portions of which are provided with bearing means 24 and 25 in which a shaft 26 is supported for rotation. Secured to the shaft 21 is a tired wheel 30. Preferably, the beet crown abrading wheel 30 includes a wheel proper 31 having a hub of any suitable construction and mounted for lateral adjustment on the shaft 26. The wheel 30 includes a peripheral or beet crown engaging section 32, which may be in the form of a pneumatic tire, such as a new or used automobile or aircraft tire. A sprocket 35 is fixed to one end of the shaft 26 and receives a sprocket chain 36 which at its rear end is trained over a sprocket 37 that is fixed to a stub shaft 38 carried by the frame 20. The stub shaft 38 is driven by a pair of bevel gears 39 and a telescopic shaft and universal joint unit 40 from the power take-off shaft 41 of the tractor.

The frame 20 is raised and lowered by a link connection 43 with the tractor power lift arm 10, the link connection 43 preferably including a link 44, the upper end of which extends through a swivel 45 carried at the outer end of the arm 10. A pair of springs 46 are disposed on opposite sides of the swivel and react against a pair of set screw collars 47 fixed to the upper portion of the link or rod 44. By virtue of this construction, the rear abrading unit may rise and fall while the power lift arm 10 remains in a given or fixed position, so as to accommodate the passage of the outfit over high and low beets.

The beet abrading wheel 30 is thus driven by a simple connection from the power take-off shaft of the tractor and the tire or pneumatic annulus thereof is inflated to a relatively low pressure so as to permit the walls of the tire to embrace and surround the upper portion or crown of each of the beets as the machine passes down a beet row. The plane of rotation of the wheel 30 coincides or lies closely adjacent the vertical longitudinal plane of the beet row, and hence the rotation of the wheel serves to scrub or polish the crowns of the beets, removing all leaf stubs, leaf scar and the like from the top and sides thereof but without taking away any appreciable portion of the sugar bearing section of the beet crown. Where centrifugal force is sufficient to hold the walls of the tire or annulus in a beet crown-embracing position, the annulus 32 may be operated without being inflated.

The beet crown abrading unit may be operated alone, as mentioned above, or it may be used in connection with forwardly disposed beet top cutting mechanism, or a rotary shredding device such as that shown in co-pending application, Serial No. 738,356, filed March 31, 1947, now U. S. Patent 2,492,962, issued January 3, 1950, may be used. Any of such forward mounted units may be connected by a link 50 to an arm 51 fixed to the power lift shaft 9.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

A beet crown abrading device, adapted to be mounted on a tractor having a rear axle structure and a rearwardly extending power take-off shaft at the rear of the tractor, said device comprising a generally vertically swingable frame, means for pivotally connecting the forward portion of said frame with the rear portion of the tractor, a beet crown abrading unit for removing superficial portions of the beet crowns, said unit comprising a wheel member rotatable about a generally transverse axis and carried by said frame, said wheel member having an inflatable annulus at the periphery of the wheel, the peripheral portion of said annulus being formed of flexible material of substantially uniform thickness from side to side and deflectable outwardly by fluid pressure within said annulus and deflectable inwardly when pressed against a beet crown, whereby a peripheral portion of said annulus embraces the beet crown and is pressed thereagainst from a plurality of directions, each generally normal to the surface of the beet crown at the point of contact therewith, means acting between the rear of the tractor and said frame for pressing said annulus downwardly against the beet crown until peripheral portions of said annulus are deflected generally radially inwardly of the wheel and simultaneously engage the top and all side portions of the beet crown with substantially constant pressure, and means connected with said rearwardly extending power take-off shaft for rotating said wheel so as to remove leaves, leaf scar and the like from beet crowns with a rubbing or abrading action while the annulus is pressed against the beet crowns.

VIRGIL F. BOZEMAN.
CLAUDE W. WALZ.

REFERENCES CITED

The following references are of record in the file of this patent:

UNITED STATES PATENTS

| Number | Name | Date |
| --- | --- | --- |
| 1,280,156 | Campbell | Oct. 1, 1918 |
| 1,332,495 | Grahm | Mar. 2, 1920 |
| 2,062,711 | Hansen | Dec. 1, 1936 |
| 2,084,398 | Jongeneel | June 22, 1937 |
| 2,116,272 | Mall | May 3, 1938 |
| 2,250,948 | Garst | July 29, 1941 |
| 2,406,013 | Grew | Aug. 20, 1946 |
| 2,409,510 | Mott | Oct. 15, 1946 |
| 2,492,962 | Bohmker et al. | Jan. 3, 1950 |